(12) United States Patent
Yonezu et al.

(10) Patent No.: US 12,449,394 B2
(45) Date of Patent: Oct. 21, 2025

(54) GAS SENSOR AND GAS SENSOR ATTACHED STRUCTURE

(71) Applicant: NGK SPARK PLUG CO., LTD., Nagoya (JP)

(72) Inventors: Kunihiko Yonezu, Nagoya (JP); Yuji Shimazaki, Nagoya (JP); Masayuki Yoshida, Nagoya (JP)

(73) Assignee: Niterra Co., Ltd., Nagoya (JP)

( * ) Notice: Subject to any disclaimer, the term of this patent is extended or adjusted under 35 U.S.C. 154(b) by 379 days.

(21) Appl. No.: 18/013,312

(22) PCT Filed: Apr. 22, 2021

(86) PCT No.: PCT/JP2021/016262
§ 371 (c)(1),
(2) Date: Dec. 28, 2022

(87) PCT Pub. No.: WO2022/091455
PCT Pub. Date: May 5, 2022

(65) Prior Publication Data
US 2023/0273149 A1 Aug. 31, 2023

(30) Foreign Application Priority Data
Oct. 29, 2020 (JP) .................. 2020-181915

(51) Int. Cl.
*G01N 27/407* (2006.01)
*G01M 15/10* (2006.01)

(52) U.S. Cl.
CPC ...... *G01N 27/4077* (2013.01); *G01M 15/102* (2013.01)

(58) Field of Classification Search
CPC .................. G01N 27/4077; G01M 15/102
See application file for complete search history.

(56) References Cited

U.S. PATENT DOCUMENTS 3,835,012 A * 9/1974 Hernak .............. G01N 27/4077
204/428
4,040,930 A * 8/1977 Dillon ................ G01N 27/4077
204/429

(Continued)

FOREIGN PATENT DOCUMENTS

JP 1-146155 U 10/1989
JP H01146155 U * 10/1989 ............. G01N 27/12

(Continued)

OTHER PUBLICATIONS

J-Plat Pat machine -generated English language translation of JP H 6-35175Y2. Downloaded Mar. 4, 2025, Japanese document published Sep. 14, 1994. (Year: 1994).*

(Continued)

*Primary Examiner* — Alexander S Noguerola
(74) *Attorney, Agent, or Firm* — Sughrue Mion, PLLC

(57) ABSTRACT

A gas sensor including: a sensor element; a metallic shell; and a single-wall tubular protector. The protector has a gas introduction hole and a gas discharge hole disposed on a forward end side in relation to the gas introduction hole. The metallic shell has a fixing portion whose outer surface is fixed to a pipe, and a larger-diameter tool engagement portion located on a rear end side of the fixing portion and used to attach the gas sensor. A distance L1 in the axial O direction between the gas introduction hole and the gas discharge hole is greater than a distance L2 in the axial direction between the tool engagement portion and the gas introduction hole; and a forward end (21a) of the sensor element is located on the forward end side in relation to the gas introduction hole.

9 Claims, 3 Drawing Sheets

(56) References Cited

U.S. PATENT DOCUMENTS

2008/0277282 A1* 11/2008 Kume ................ G01N 27/4077
                                                                                               219/121.64
2017/0212072 A1    7/2017 Toguchi et al.
2017/0363596 A1* 12/2017 Adachi .............. G01N 27/4077

FOREIGN PATENT DOCUMENTS

| JP | H06-35175 Y2 * | 9/1994 | ........... G01N 27/409 |
|----|----------------|--------|-------------------------|
| JP | 2007-114066 A | 5/2007 | |
| JP | 2008-281583 A | 11/2008 | |
| JP | 2013-257192 A | 12/2013 | |
| JP | 2015-040716 A | 3/2015 | |
| JP | 2016-023985 A | 2/2016 | |
| JP | 2017-067734 A | 4/2017 | |
| JP | 2019-070601 A | 5/2019 | |

OTHER PUBLICATIONS

International Preliminary Report on Patentability and Written Opinion of the International Searching Authority issued from the International Bureau in counterpart International Application No. PCT/JP2021/016262, mailed on May 2, 2023.
International Search Report for PCT/JP2021/016262 dated Jul. 6, 2021.
Office Action dated Apr. 26, 2025 for corresponding Chinese Application No. 202180039154.X (12 pages).

* cited by examiner

GAS SENSOR AND GAS SENSOR ATTACHED STRUCTURE

CROSS-REFERENCE TO RELATED APPLICATIONS

The application is a National Stage of International Application No. PCT/JP2021/016262 filed Apr. 22, 2021, claiming priority based on Japanese Patent Application No. 2020-181915, filed Oct. 29, 2020.

BACKGROUND OF THE INVENTION

1. Field of the Invention

The present invention relates to a gas sensor having a single-wall protector, and to a gas sensor attached structure.

2. Description of the Related Art

Conventionally, a gas sensor has been known in which a sensor element is held by a tubular metallic shell, and a forward end portion of the sensor element, which portion is exposed to exhaust gas, is protected by a single-wall or double-wall protector. A gas introduction hole is provided in the protector. A requirement of the gas introduction hole is to secure wetting resistance by preventing condensed water mixed in the exhaust gas from reaching the sensor element and to secure responsiveness by quickly introducing the exhaust gas into a detection section of the sensor element.

In view of the above, a technique of improving responsiveness by employing a single-wall protector has been developed (Patent Document 1). In this technique, a sensor element is held inside a tubular insulator, and a porous filter is disposed at a gas introduction opening provided at a forward end of the insulator. By virtue of this configuration, condensed water having reached the gas introduction opening can be trapped by the porous filter, thereby preventing wetting of the sensor element.

Patent Document 1: Japanese Patent Application Laid-Open (kokai) No. 2017-67734 (FIG. 1)

3. Problems to be Solved by the Invention

However, in the case of the above-described technique, the sensor element is disposed inside the insulator, and exhaust gas is introduced to the sensor element via the porous filter. Therefore, even when a single-wall protector is employed, responsiveness tends to lower.

SUMMARY OF THE INVENTION

The present invention has been accomplished in view of the above circumstances, and an object thereof is to provide a gas sensor and a gas sensor attached structure which can enhance both wetting resistance and responsiveness using a single-wall protector.

The above object has been achieved in a first aspect (1) of the present invention by providing a gas sensor comprising: a sensor element which extends in an axial direction and has a detection section formed in a forward end portion and detecting a gas to be detected; a tubular metallic shell which surrounds a circumference of the sensor element in a radial direction and holds the sensor element; and a single-wall tubular protector fixed to a circumference of a forward end portion of the metallic shell and surrounding the forward end portion of the sensor element. The protector has a gas introduction hole and a gas discharge hole disposed on a forward end side in relation to the gas introduction hole. The metallic shell has a fixing portion whose outer surface is fixed directly or indirectly to a pipe through which the gas to be detected flows, and a larger-diameter tool engagement portion located on a rear end side of the fixing portion adapted for fixing the gas sensor to the pipe. A distance L1 in the axial direction between the gas introduction hole and the gas discharge hole is greater than a distance L2 in the axial direction between the tool engagement portion and the gas introduction hole. Further, a forward end of the sensor element is located on the forward end side in relation to the gas introduction hole.

According to the above gas sensor (1), a forward end portion of the gas sensor can be projected into the interior of a pipe. Specifically, when the gas sensor is attached by fixing the fixing portion to the pipe such that the forward end portion of the gas sensor projects into the interior of the pipe and such that a forwardly facing surface of the tool engagement portion comes into contact with an outer surface of the pipe, a portion of the protector (the forward end portion of the gas sensor), which corresponds to the distance L1 and is longer than a portion corresponding to the distance L2, can readily be projected into the interior of the pipe.

As a result, it becomes possible to cause the gas discharge hole located at the forward end portion of the gas sensor to be closer to the center of the pipe where the flow speed of the gas to be detected is the highest. Thus, the gas to be detected within the protector can be reliably discharged to the outside through the gas discharge hole by negative pressure. Therefore, responsiveness is improved.

Also, since the distance L2 is rendered shorter than the distance L1, it becomes easier to dispose the gas introduction hole on a radially outer side of the pipe. As a result, it becomes possible to prevent direct exposure of the gas introduction hole to the gas to be detected which is present within the pipe and whose flow speed is high, thereby preventing direct entry of water droplets, which are contained in the gas to be detected, into the protector through the gas introduction hole. As a result, wetting resistance is improved.

Also, as compared with the vicinity of the gas discharge hole where the flow speed of the gas to be detected is the highest and negative pressure is created, the pressure at the gas introduction hole located on the outer side of the pipe becomes higher, and the pressure difference between the gas discharge hole and the gas introduction hole becomes large. Therefore, gas replacement within the protector is accelerated, whereby responsiveness is further improved.

In a preferred embodiment (2) of the gas sensor (1) of the present invention, a maximum inner diameter DA of the protector in a region corresponding to the distance L1 is equal to or less than ½ of the distance L1.

According to the above gas sensor (2), a portion of the protector, which portion is located on the forward end side of the gas introduction hole and corresponds to the distance L1, is elongated in the axial direction. Therefore, the pressure in the vicinity of the gas discharge hole becomes more strongly negative due to the Venturi effect. As a result, the gas to be detected within the protector is discharged to the outside through the gas discharge hole more effectively, whereby responsiveness is further improved.

In another preferred embodiment (3) of the above gas sensor (1) or (2) of the present invention, a total opening area S1 of the gas discharge hole is equal to or less than 50% of an area S2 of a bottom portion of the protector.

According to the above gas sensor (3), the pressure in the vicinity of the gas discharge hole becomes more strongly negative, and the gas to be detected within the protector is discharged to the outside through the gas discharge hole more effectively, whereby responsiveness is further improved.

In a second aspect (4), the present invention provides a gas sensor attached structure comprising: a gas sensor; and a pipe through which a gas to be detected flows and to which the gas sensor is attached, wherein the gas sensor is the gas sensor of any of (1) to (3) above. In a state in which the gas sensor is attached by fixing the fixing portion directly or indirectly to the pipe such that a forward end portion of the gas sensor projects from an attachment hole of the pipe into an interior of the pipe and a forwardly facing surface of the tool engagement portion is in direct or indirect contact with an outer surface of the pipe, the gas introduction hole is disposed on a radially outer side of an imaginary inner surface of the attachment hole formed by extrapolating a contour of an inner surface of the pipe at the position of the attachment hole in a cross section of the pipe along the radial direction, and the gas discharge hole is disposed inside the pipe.

According to the above gas sensor attached structure (4), the forward end portion of the gas sensor can be projected into the interior of a pipe. Specifically, when the gas sensor is attached by fixing the fixing portion to the pipe such that the forward end portion of the gas sensor projects into the interior of the pipe from the attachment hole of the pipe and such that a forwardly facing surface of the tool engagement portion comes into contact with an outer surface of the pipe, a portion of the protector (the forward end portion of the gas sensor), which corresponds to the distance L1 and is longer than a portion corresponding to the distance L2, can readily be projected into the interior of the pipe.

As a result, it becomes possible to cause the gas discharge hole located at the forward end portion of the gas sensor to be closer to the center of the pipe where the flow speed of the gas to be detected is the highest. Thus, the gas to be detected within the protector can be reliably discharged to the outside through the gas discharge hole by negative pressure. Therefore, responsiveness is improved.

Also, since the distance L2 is rendered shorter than the distance L1, it becomes easier to dispose the gas introduction hole on the radially outer side of the imaginary inner surface of the attachment hole. As a result, it is possible to prevent direct exposure of the gas introduction hole to the gas to be detected which is present within the pipe and whose flow speed is high, thereby preventing direct entry of water droplets, which are contained in the gas to be detected, into the protector through the gas introduction hole. As a result, wetting resistance is improved.

Also, as compared with the vicinity of the gas discharge hole where the flow speed of the gas to be detected is the highest and negative pressure is created, the pressure at the gas introduction hole located on the outer side of the imaginary inner surface of the pipe becomes higher, and the pressure difference between the gas discharge hole and the gas introduction hole becomes large. Therefore, gas replacement within the protector is accelerated, whereby responsiveness is further improved.

Effect of the Invention

According to the present invention, a gas sensor and a gas sensor attached structure can be obtained which can enhance both wetting resistance and responsiveness by using a single-wall protector.

DESCRIPTION OF REFERENCE NUMERALS

Figure 1:
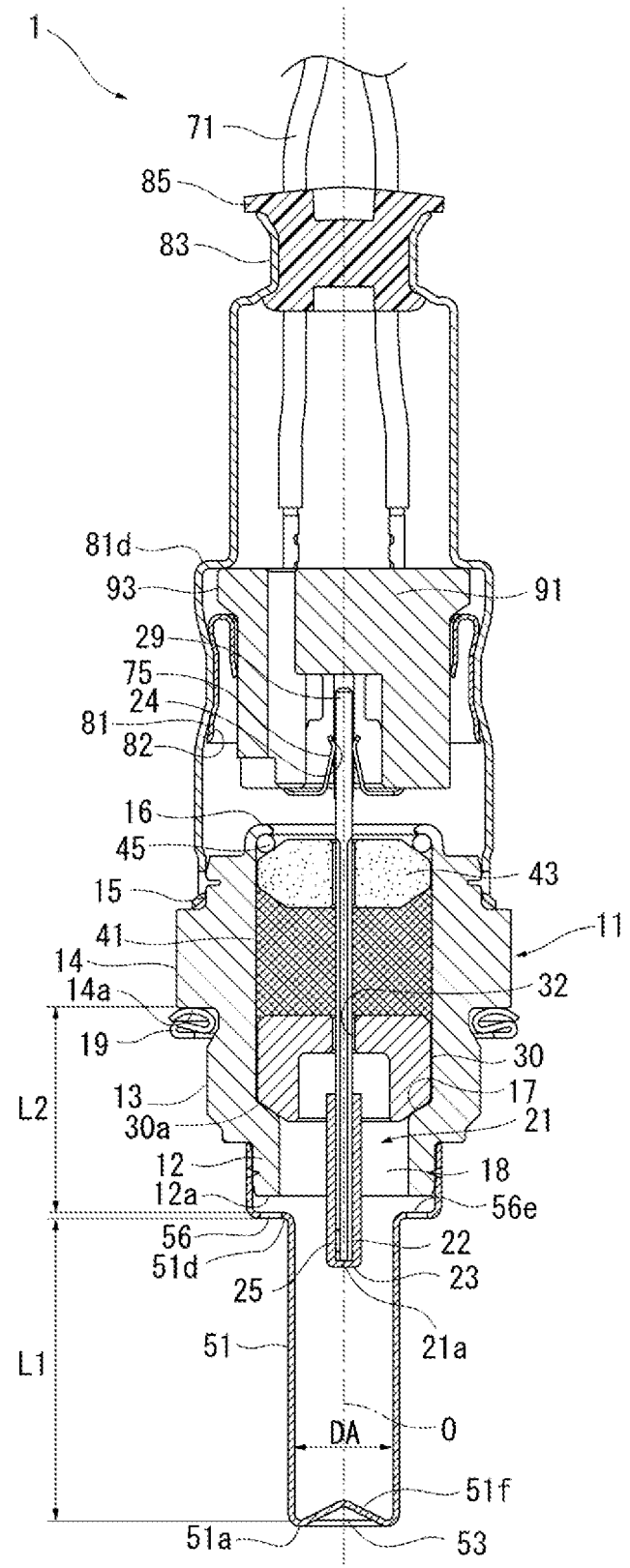
FIG. 1 is a sectional view of a gas sensor according to an embodiment of the present invention.

Reference numerals used to identify various features in the drawings include the following.
1 gas sensor
13 fixing portion (male screw)
14 tool engagement portion
14a forwardly facing surface of the tool engagement portion
21 sensor element
21a forward end of the sensor element
22 detection section
51 protector
53 gas discharge hole
56 gas introduction hole
100 pipe
100a2 imaginary inner surface
100e outer surface of the pipe
100h attachment hole
O axial line
G gas to be detected

DETAILED DESCRIPTION OF THE PREFERRED EMBODIMENTS

Figure 2:
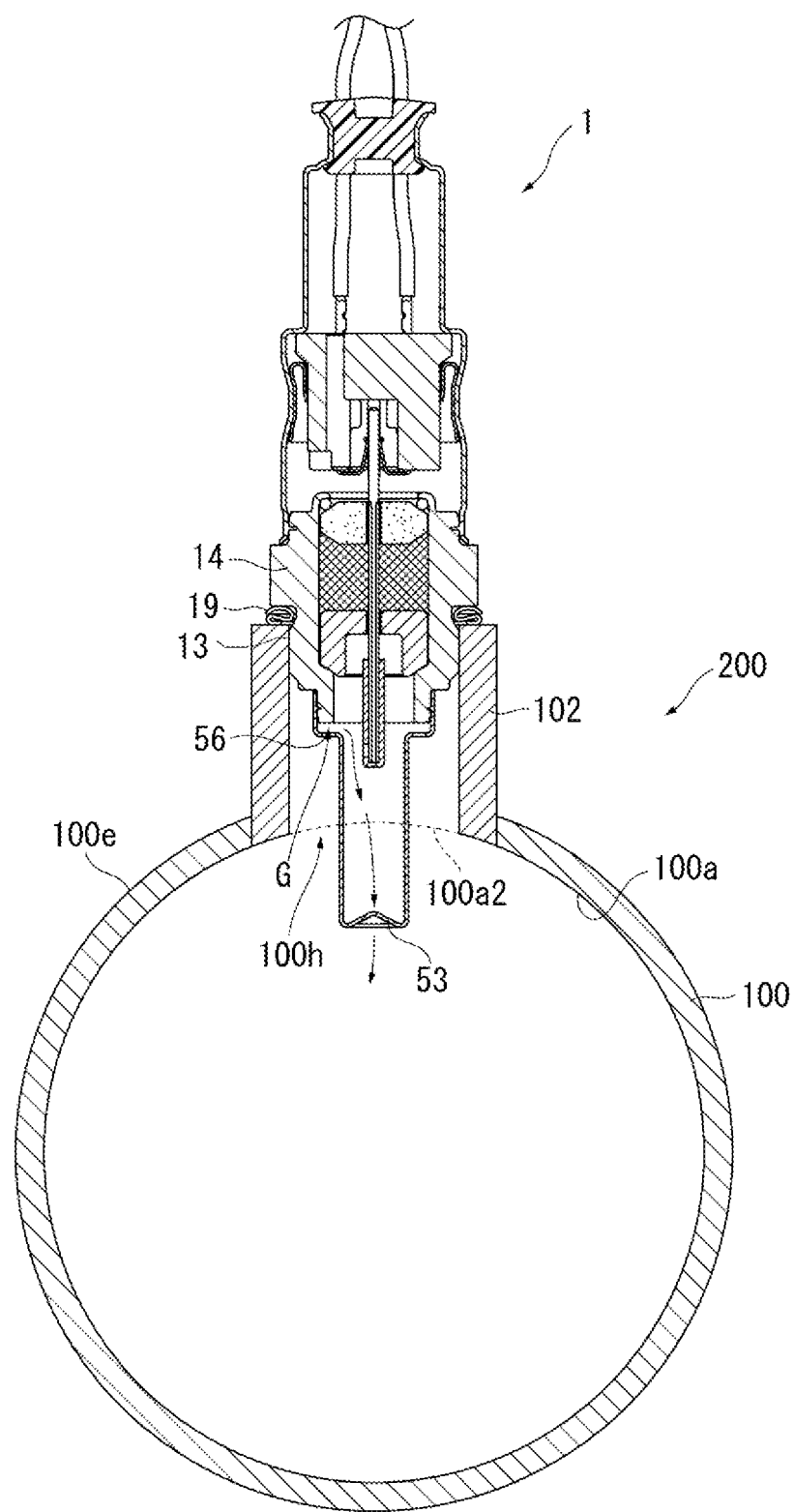
FIG. 2 is a sectional view of a gas sensor attached structure in which a gas sensor is attached to a pipe.
Figure 3:
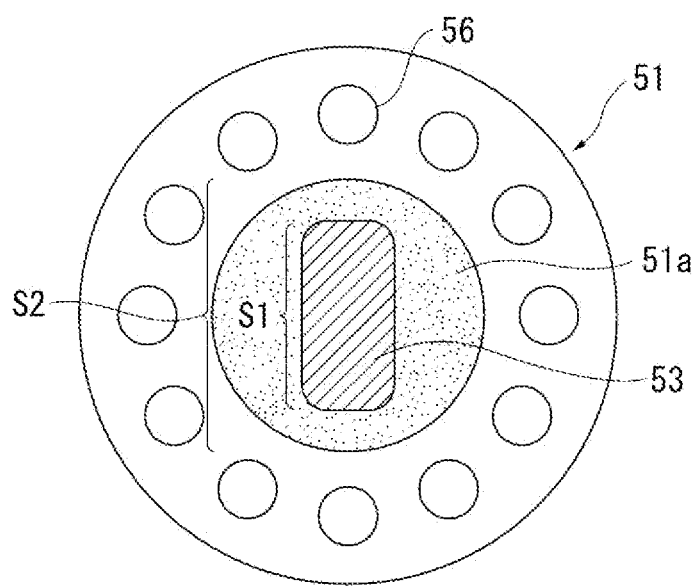
FIG. 3 is a plan view of a protector as viewed from a forward end side toward a rear end side.

The present invention will now be described in greater detail with reference to the drawings. However, the present invention should not be construed as being limited thereto. FIG. 1 is a sectional view of a gas sensor 1 according to the embodiment of the first mode of the present invention. FIG. 2 is a sectional view of a gas sensor attached structure 200 in which a gas sensor 1 is attached to a pipe 100. FIG. 3 is a plan view of a protector 51 as viewed from a forward end side toward a rear end side.

In FIG. 1, the gas sensor (full-range air-fuel-ratio gas sensor) 1 includes a sensor element 21; a holder (ceramic holder) 30 having a through hole 32 which penetrates in the direction of an axial line O and into which the sensor element 21 is inserted; a metallic shell 11 which surrounds a circumference of the ceramic holder 30 in a radial direction; and a protector 51.

A forward end portion of the sensor element 21, where a detection section 22 is formed, projects forward from the ceramic holder 30 and the metallic shell 11. The sensor element 21, which is inserted into the through hole 32, is fixed inside the metallic shell 11. Gas tightness in a forward-rearward direction is secured, as a result of a seal material (talc in the present example) 41, which is disposed on the rear end surface side (the upper side in FIG. 1) of the ceramic holder 30. The seal material 41 is compressed in the forward-rearward direction via a sleeve 43 formed of an insulating material and a ring washer 45.

Notably, a rear end portion 29 of the sensor element 21 projects rearward from the sleeve 43 and the metallic shell 11. Metallic terminal members 75 provided at tips of respective lead wires 71 extending to the outside through a seal member 85 are brought into pressure contact with respective electrode terminals 24 formed on the rear end portion 29, thereby being electrically connected to the respective electrode terminals 24. Also, the rear end portion 29 of the sensor element 21, which portion includes the electrode terminals 24, are covered by an outer casing 81. A further detailed description is given below.

The sensor element 21 extends in the direction of the axial line O and has a strip-plate-like shape (plate-like shape). The sensor element 21 has a detection section 22 provided on a forward end portion (the lower side in FIG. 1) directed toward a measurement target. The detection section 22 is composed of detection electrodes, etc. (not shown) and detects a particular gas component contained in a gas to be detected. The sensor element 21 has a rectangular transverse cross section whose size is constant in the forward-rearward direction. The sensor element 21 is formed mainly of a ceramic material (solid electrolyte, etc.) such that the sensor element 21 has an elongated shape. The sensor element 21 itself is the same as a conventionally known sensor element. A pair of detection electrodes which constitute the detection section 22 are disposed on a forward end portion of the solid electrolyte (member). The electrode terminals 24 which are connected to the detection electrodes and to which one end of the lead wires 71 for taking out detection output are connected are formed on a rear end portion of the solid electrolyte (member), a second end of the lead wires 71 being exposed to the outside.

In the present example, a heater (not shown) is provided in a forward end portion of a ceramic member laminated on the solid electrolyte (member) of the sensor element 21. Electrode terminals 24 to which one end of the lead wires 71 for applying a voltage to the heater are connected are formed on a rear end portion of the ceramic member, a second end of the lead wires 71 being exposed to the outside. Notably, although not illustrated, these electrode terminals 24 are formed to have a longitudinally elongated rectangular shape and are disposed on the rear end portion 29 of the sensor element 21, for example, such that three or two electrode terminals are juxtaposed laterally on each of wider surfaces (opposite surfaces) of the strip plate.

Notably, a porous protective layer 23 formed of alumina, spinel, or the like is provided to cover the detection section 22 of the sensor element 21. Also, the sensor element 21 has an element introduction hole 25 which communicates with the detection section 22 and through which the gas to be detected is introduced into the detection section 22. An unillustrated porous diffusion resistor layer is disposed in the element introduction hole 25.

The metallic shell 11 is tubular and has concentric portions which are juxtaposed in the forward-rearward direction and have different diameters. Specifically, the metallic shell 11 has a cylindrical annular portion (hereinafter also referred to as the cylindrical portion) 12 which is provided on the forward end side, which is small in diameter, and onto which a protector 51 (described below) is fixedly fitted. A screw (fixing portion) 13 which is a male screw and larger in diameter than the cylindrical portion 12 and is used for fixing to an exhaust pipe of an engine is provided on an outer circumferential surface on the rearward side (the upper side in the drawing) of the cylindrical portion 12. The metallic shell 11 has a polygonal tool engagement portion 14 provided on the rearward side of the screw 13. The tool engagement portion 14 is used to screw the screw 13, thereby attaching the sensor 1. Also, the metallic shell 11 has a cylindrical portion 15 provided on the rearward side of the tool engagement portion 14. The protecting tube (outer casing) 81, which covers a rear portion of the gas sensor 1 is fitted onto and welded to the cylindrical portion 15. The metallic shell 11 has a cylindrical portion for crimping 16 provided on the rearward side of the cylindrical portion 15. The cylindrical portion for crimping 16 has an outer diameter and a wall thickness smaller than those of the cylindrical portion 15.

Notably, the tool engagement portion 14 has a larger diameter than the screw 13, and a step portion is formed between a forwardly facing surface 14a of the tool engagement portion 14 and the rear end side of the screw 13.

Notably, in FIG. 1, the cylindrical portion for crimping 16 has an inwardly bent shape because the cylindrical portion for crimping 16 has been crimped. Notably, a gasket 19 is attached to a lower surface of the tool engagement portion 14. The gasket 19 establishes a seal when the screw 13 is screwed.

Meanwhile, the metallic shell 11 has an internal hole 18 which penetrates the metallic shell 11 in the direction of the axial line O. The inner circumferential surface of the internal hole 18 has a step portion 17 tapered such that the step portion tapers radially inward from the rear end side toward the forward end side.

The holder (ceramic holder) 30, which is formed of an insulating ceramic material (for example, alumina) and is formed into an approximately short cylindrical shape, is disposed inside the metallic shell 11. The ceramic holder 30 has a forwardly facing surface 30a which is tapered down toward the forward end. As a result of the ceramic holder 30 being pressed by the seal material 41 from the rear end side, while a radially outer portion of the forwardly facing surface 30a is engaged with the step portion 17, the ceramic holder 30 is positioned in the metallic shell 11 and loosely fitted thereinto.

Meanwhile, the through hole 32 is provided at the center of the ceramic holder 30 and is a rectangular opening whose size is approximately the same as the transverse cross section of the sensor element 21 so that the sensor element 21 extends through the through hole 32 with substantially no clearance.

The sensor element 21 extends through the through hole 32 of the ceramic holder 30, and the forward end 21a of the sensor element 21 projects forward in relation to the ceramic holder 30 and the forward end 12a of the metallic shell 11.

Meanwhile, a forward end portion of the sensor element 21 is covered with a single-wall protector (protection cover) 51 having the shape of a bottomed cylinder. The rear end of the protector 51 is fitted onto and welded to the cylindrical portion 12 of the metallic shell 11. The protector 51 has a step portion 51d formed at a location near the rear end. The step portion 51d extends in the radial direction (direction perpendicular to the direction of the axial line O). The protector 51 has a smaller diameter on the forward end side of the step portion 51d.

Gas introduction holes 56 are formed in the step portion 51d. As shown in FIG. 3, in the present example, a plurality (twelve) of gas introduction holes 56 are provided at equal intervals in the circumferential direction of the step portion 51d.

Notably, the gas introduction holes 56 may be formed such that a perpendicular line of a plane 56e that passes through a portion of the circumferential edge of each gas introduction hole 56, which portion is located on the inner side of the protector 51, forms an angle in relation to the radial direction (is not parallel to the radial direction), and the portion of the circumferential edge of each gas introduction hole 56, which portion is located on the inner side of the protector 51, is located rearmost. In other words, the portion of the circumferential edge of each gas introduction hole 56, which portion is located on the inner side of the protector 51, is located on the rear end side in relation to a portion of the circumferential edge of the gas introduction hole 56, which portion is located on the outer side of the protector 51. This configuration is preferred because water droplets in the gas to be detected thereby are unlikely to enter the protector 51 through the gas introduction holes 56.

Meanwhile, a gas discharge hole 53 (one in the present example) is provided at the center of a bottom portion 51a of the protector 51. The gas discharge hole 53 is disposed on the forward end side in relation to the gas introduction hole 56. Because of the flow of the gas to be detected which flows through a pipe to which the gas sensor 1 is attached, gas within the protector 51 is sucked to the outside through the gas discharge hole 53, whereby a negative pressure is generated. Because of this negative pressure, the gas to be detected is introduced into the protector 51 through the gas introduction holes 56.

Notably, in the example of FIG. 1, two parallel slits allow a central portion of the bottom portion 51a of the protector 51 to be raised toward the rear end side, thereby forming a cover 51f. The gas discharge hole 53 is formed in the gap between the bottom portion 51a of the protector 51 and the cover 51f such that the gas discharge hole 53 extends in the radial direction. In this case, when the protector 51 is viewed from the forward end side in the direction of the axial line O, the gas discharge hole 53 can not be directly seen. Therefore, it is possible to restrain a droplet of condensed water or the like from invading the protector 51 through the gas discharge hole 53.

Also, as shown in FIG. 1, on account of the spring characteristics of the respective metallic terminal members 75, the respective metallic terminal members 75, which are provided at the tips of the respective lead wires 71 extending to the outside through the seal member 85, are brought into pressure contact with respective electrode terminals 24 formed on the rear end portion 29 of the sensor element 21, whereby the respective metallic terminal members 75 are electrically connected to the respective electrode terminals 24. In the gas sensor 1 of the present example, the respective metallic terminal members 75, including their pressure contact portions, are provided to face each other in respective accommodation spaces provided in an insulating separator 91 disposed in the outer casing 81. Notably, movements of the separator 91 in the radial direction and toward the forward end side are restricted by a holding member 82 fixedly held within the outer casing 81 by means of crimping. A forward end portion of the outer casing 81 is fitted onto and welded to the cylindrical portion 15 on the rear end side of the metallic shell 11, whereby a rear portion of the gas sensor 1 is gastightly covered.

Notably, the lead wires 71 extend to the outside through the seal member (for example, rubber) 85 disposed inside a rear end portion of the outer casing 81. The seal member 85 is compressed by reducing the diameter of the small diameter tubular portion 83 by means of crimping, whereby the gastightness of this portion is maintained.

The outer casing 81 has a step portion 81d which is formed at a position slightly shifted toward the rear end side from the center in the direction of the axial line O such that the outer casing 81 has a larger diameter on the forward end side of the step portion 81d. The inner surface of the step portion 81d supports the separator 91 while pressing forward the rear end of the separator 91. Meanwhile, the separator 91 has a flange 93 formed on the outer circumference thereof, and the flange 93 is supported on the holding member 82 fixed to the inner side of the outer casing 81, whereby the separator 91 is held in position in the direction of the axial line O by the step portion 81d and the holding member 82.

Next, a characteristic feature of the present invention will be described.

As shown in FIG. 1, in the present embodiment, the distance L1 in the direction of the axial line O between the gas introduction holes 56 and the gas discharge hole 53 is greater than the distance L2 in the direction of the axial line O between the tool engagement portion 14 and the gas introduction holes 56, and the forward end 21a of the sensor element 21 is located on the forward end side in relation to the gas introduction holes 56.

As shown in FIG. 2, the gas sensor 1 is attached to a pipe 100 (exhaust pipe or the like) through which the gas G to be detected flows, as a result of the screw 13 being fixed directly or indirectly to the pipe 100, such that a forward end portion of the gas sensor 1 projects from an attachment hole 100h of the pipe 100 into the interior of the pipe 100 and the forwardly facing surface 14a of the tool engagement portion 14 comes into direct or indirect contact with an outer surface 100e of the pipe 100. By virtue of the above-described configuration, a portion of the protector 51 (the forward end portion of the gas sensor 1), which corresponds to the distance L1 and is longer than a portion corresponding to the distance L2, can readily be projected into the interior of the pipe 100.

As a result, it becomes possible to cause the gas discharge hole 53 located at the forward end portion of the gas sensor to be closer to the center of the pipe 100 where the flow speed of the gas G to be detected is the highest. Thus, the gas G to be detected within the protector 51 can be reliably discharged to the outside through the gas discharge hole 53 by negative pressure. Therefore, responsiveness is improved.

Also, since the distance L2 is rendered shorter than the distance L1, it is easy to dispose the gas introduction holes 56 on the radially outer side of an imaginary inner surface 100a2 of the attachment hole 100h. As a result, it is possible to prevent direct exposure of the gas introduction hole 56 to the gas G to be detected which is present within the pipe 100 and whose flow speed is high, thereby preventing direct entry of water droplets, which are contained in the gas G to be detected, into the protector 51 through the gas introduction hole 56. As a result, wetting resistance is improved.

Also, as compared with the vicinity of the gas discharge hole 53 where the flow speed of the gas G to be detected is the highest and negative pressure is created, the pressure at the gas introduction holes 56 located on the outer side of the imaginary inner surface 100a2 of the pipe 100 becomes higher, and the pressure difference between the gas discharge hole 53 and the gas introduction holes 56 becomes large. Therefore, as indicated by the flow of the gas G to be detected (arrows), which is shown in FIG. 2, it becomes easier to introduce the gas into the protector 51, through the gas introduction holes 56, on the outer side of the imaginary inner surface 100a2, while more effectively discharging the gas G to be detected to the outside through the gas discharge hole 53. As a result, gas replacement within the protector 51 is accelerated, whereby responsiveness is further improved.

In contrast, in the case where the distance L2 is equal to or longer than the distance L1, the distance L2 between the tool engagement portion 14 and the gas introduction holes 56 is excessively large. As a result, even when the tool engagement portion 14 is kept away from the attachment hole 100*h* of the pipe 100 toward the radially outer side, the gas introduction holes 56 themselves may enter an interior portion (on the radially inner side of the imaginary inner surface 100*a*2) of the attachment hole 100*h*. In that case, the gas introduction holes 56 are directly exposed to the gas G to be detected which is present within the pipe 100 and whose flow speed is high, whereby wetting resistance lowers.

Also, in the case where the distance L2 is equal to or longer than the distance L1, the portion of the protector 51 (the forward end portion of the gas sensor), which corresponds to the distance L1, becomes relatively short. Therefore, it becomes difficult to cause the forward end portion of the gas sensor to project from the attachment hole 100*h* into a more interior region of the pipe 100. As a result, it becomes difficult to cause the gas discharge hole 53 to be closer to the center of the pipe 100. Therefore, it becomes difficult to maintain the gas discharge hole 53 at negative pressure, whereby responsiveness lowers.

Notably, the distance L1 is the distance in the direction of the axial line O between the gas introduction holes 56 and the gas discharge hole 53 and represents the distance between the forward ends of the gas introduction holes 56 and the rear end of the gas discharge hole 53.

Similarly, the distance L2 is the distance in the direction of the axial line O between the tool engagement portion 14 and the gas introduction holes 56 and represents the distance between the forwardly facing surface 14*a* of the tool engagement portion 14 and the rear ends of the gas introduction holes 56.

Also, in the case where the protector 51 has a plurality of gas introduction holes 56 and a plurality of gas discharge holes 53, the distance L1 represents the distance between the forwardmost one of the forward ends of the plurality of gas introduction holes 56 and the rearmost one of the rear ends of the plurality of gas discharge holes 53. Similarly, the distance L2 represents the distance between the forwardly facing surface 14*a* of the tool engagement portion 14 and the forwardmost one of the forward ends of the gas introduction holes 56.

Also, the reason why the forward end 21*a* of the sensor element 21 must be located on the forward end side in relation to the gas introduction holes 56 is as follows. Namely, the gas G to be detected having been introduced from the gas introduction holes 56 flows toward the forward end side within the protector 51. In view of this flow path, the forward end 21*a* of the sensor element 21 is located on the forward end side in relation to the gas introduction holes 56. As a result, it becomes easier to cause the gas G to be detected to come into contact with the detection section 22 (located in the vicinity of the forward end 21*a*) of the sensor element 21 without fail, whereby detection accuracy is improved.

The expression "the screw 13 is fixed directly or indirectly to the pipe 100" means the following. In the present example, a bore tube 102 is fixed to the periphery of the pipe 100 so as to surround the attachment hole 100*h* of the pipe 100, and a fixing portion (the male screw 13) of the metallic shell 11 is screw-engaged with a pipe-side fixing portion (for example, a female screw) on the inner surface of the bore tube 102, whereby the gas sensor 1 is fixed. This state is regarded as a state in which the screw 13 is fixed "indirectly" to the pipe 100.

Meanwhile, in the case where a portion of the pipe 100 near the attachment hole 100*h* integrally protrudes toward the radially outer side or the pipe 100 itself has a large thickness, without use of the bore tube 102, the screw 13 is fixed "directly" to a pipe-side fixing portion (for example, a female screw) on the inner surface of the pipe 100.

Similarly, the expression "the forwardly facing surface 14*a* of the tool engagement portion 14 is attached in direct or indirect contact with the outer surface 100*e* of the pipe 100" means the following. In the present example, this expression means a state in which the forwardly facing surface 14*a* of the tool engagement portion 14 is in contact with an outer surface (rearward facing surface) of the bore tube 102 in a state in which the screw 13 is fixed to the bore tube 102. Specifically, when the screw (male screw) 13 of the metallic shell 11 is screw-engaged with the female screw on the inner surface of the bore tube 102 by using a tool, such as a spanner, engaged with the tool engagement portion 14, the forwardly facing surface 14*a* of the tool engagement portion 14 butts against the outer surface of the bore tube 102 via a gasket 19. This state is regarded as a state in which the the forwardly facing surface 14*a* of the tool engagement portion 14 is attached in "indirect" contact with the outer surface 100*e* of the pipe 100.

Meanwhile, in the case where a portion of the pipe 100 near the attachment hole 100*h* integrally protrudes toward the radially outer side or the pipe 100 itself has a large thickness, without use of the bore tube 102, the gas sensor is attached so that the forwardly facing surface 14*a* of the tool engagement portion 14 is in "direct" contact with the outer surface 100*e* of the pipe 100 via the gasket 19 in a state in which the screw 13 is fixed to the pipe 100 itself.

Also, the "imaginary inner surface 100*a*2" of the attachment hole 100*h* means an inner surface formed by extrapolating, at the position of the attachment hole 100*h*, the contour of the inner surface 100*a* of the pipe 100 in a cross section of the pipe 100 along the radial direction shown in FIG. 2. This extrapolation can be performed by, for example, plotting a large number of points on the inner surface 100*a* of the pipe 100 and determining an approximation curve passing through these points.

The region on the radially inner side of the imaginary inner surface 100*a*2 can be regarded as the interior of the pipe 100 through which the gas G to be detected flows. Meanwhile, the region on the radially outer side of the imaginary inner surface 100*a*2 can be regarded as the outside of the pipe 100, and, conceivably, the gas G to be detected hardly flows through this region.

When the maximum inner diameter DA of the protector in a region corresponding to the distance L1 is equal to or less than ½ of the distance L1, the portion of the protector 51, which portion is located on the forward end side of the gas introduction holes 56 and corresponds to the distance L1, is elongated in the direction of the axial line O. Therefore, the pressure in the vicinity of the gas discharge hole 53 becomes more strongly negative due to the Venturi effect, and the gas to be detected within the protector 51 is discharged to the outside through the gas discharge hole 53 more effectively, whereby responsiveness is further improved.

Also, in the case where, as shown in FIG. 3, the total opening area S1 of the gas discharge hole(s) 53 is equal to or less than 50% of the area S2 of the bottom portion 51*a* of the protector 51, the pressure in the vicinity of the gas discharge hole 53 becomes more strongly negative, and the gas within the protector 51 is discharged to the outside through the gas discharge hole 53 more effectively. Therefore, responsiveness is further improved.

Notably, in order to lower the pressure in the vicinity of the gas discharge hole 53 without fail, the gas discharge hole 53 is preferably located at the forwardmost end of the protector 51; namely, in the bottom portion 51*a*.

The structure and configuration of the gas sensor of the present invention may be changed freely without departing from the scope of the present invention.

For example, in the above-described embodiments, the step portion 51*d* of the protector 51 is formed to extend in the radial direction (parallel to the radial direction), and the perpendicular line of the plane passing through a portion of the edge of each gas introduction hole 56 provided in the step portion 51*d*, which portion is located on the inner side of the protector 51, is perpendicular to the radial direction. However, the step portion of the protector 51 may be formed to have an angle with respect to the radial direction.

Accordingly, it is preferred that, when each gas introduction hole is viewed from the outer side in the radial direction, the interior of the protector cannot be seen. However, a configuration may be employed in which the step portion 51*d* of the protector 51 is tapered such that the step portion 51*d* descends (to the forward end side) toward the radially inner side, but the interior of the protector 51 cannot be seen when the gas introduction holes 56 are viewed from the outside in the radial direction.

Also, the sensor element is not limited to those for measuring the concentration of oxygen and may be a sensor for measuring the concentration of nitrogen oxide (NOx), hydrocarbon (HC), etc.

A tubular sensor element may be used.

No limitation is imposed on the shapes and numbers of the gas introduction holes and the gas discharge hole. For example, the gas introduction holes and/or the gas discharge hole may have an elliptical shape. The shape of the forwardly facing surface of the metallic shell is not limited to the above-described shape.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

The invention claimed is:

1. A gas sensor comprising:
   a sensor element which extends in an axial direction and has a detection section formed in a forward end portion and configured to detect a gas to be detected;
   a tubular metallic shell which surrounds a circumference of the sensor element in a radial direction and holds the sensor element; and
   a single-wall tubular protector fixed to a circumference of a forward end portion of the metallic shell and surrounding the forward end portion of the sensor element, wherein
   the protector has a gas introduction hole and a gas discharge hole disposed on a forward end side in relation to the gas introduction hole, and the protector further has a step portion which is formed to extend in the radial direction or formed to have an angle with respect to the radial direction, and the gas introduction hole is provided in the step portion;
   the metallic shell has a fixing portion whose outer surface is fixed directly or indirectly to a pipe through which the gas to be detected flows, and a larger-diameter tool engagement portion located on a rear end side of the fixing portion adapted for fixing the gas sensor to the pipe;
   a distance L1 in the axial direction between the gas introduction hole and the gas discharge hole is greater than a distance L2 in the axial direction between the tool engagement portion and the gas introduction hole; and
   a forward end of the sensor element is located on the forward end side in relation to the gas introduction hole.

2. The gas sensor as claimed in claim 1, wherein a maximum inner diameter DA of the protector in a region corresponding to the distance L1 is equal to or less than ½ of the distance L1.

3. The gas sensor as claimed in claim 2, wherein a total opening area S1 of the gas discharge hole is equal to or less than 50% of an area S2 of a bottom portion of the protector.

4. A gas sensor attached structure comprising:
   the gas sensor as claimed in claim 2; and
   a pipe through which a gas to be detected flows and to which the gas sensor is attached, wherein
   in a state in which the gas sensor is attached by fixing the fixing portion directly or indirectly to the pipe such that a forward end portion of the gas sensor projects from an attachment hole of the pipe into an interior of the pipe and a forwardly facing surface of the tool engagement portion is in direct or indirect contact with an outer surface of the pipe,
   the gas introduction hole is disposed on a radially outer side of an imaginary inner surface of the attachment hole formed by extrapolating a contour of an inner surface of the pipe at the position of the attachment hole in a cross section of the pipe along the radial direction, and
   the gas discharge hole is disposed inside the pipe.

5. The gas sensor as claimed in claim 1, wherein a total opening area S1 of the gas discharge hole is equal to or less than 50% of an area S2 of a bottom portion of the protector.

6. A gas sensor attached structure comprising:
   the gas sensor as claimed in claim 5; and
   a pipe through which a gas to be detected flows and to which the gas sensor is attached, wherein
   in a state in which the gas sensor is attached by fixing the fixing portion directly or indirectly to the pipe such that a forward end portion of the gas sensor projects from an attachment hole of the pipe into an interior of the pipe and a forwardly facing surface of the tool engagement portion is in direct or indirect contact with an outer surface of the pipe,
   the gas introduction hole is disposed on a radially outer side of an imaginary inner surface of the attachment hole formed by extrapolating a contour of an inner surface of the pipe at the position of the attachment hole in a cross section of the pipe along the radial direction, and
   the gas discharge hole is disposed inside the pipe.

7. A gas sensor attached structure comprising:
   the gas sensor as claimed in claim 1; and
   a pipe through which a gas to be detected flows and to which the gas sensor is attached, wherein
   in a state in which the gas sensor is attached by fixing the fixing portion directly or indirectly to the pipe such that a forward end portion of the gas sensor projects from an attachment hole of the pipe into an interior of the pipe and a forwardly facing surface of the tool engagement portion is in direct or indirect contact with an outer surface of the pipe, the gas introduction hole is disposed on a radially outer side of an imaginary inner surface of the attachment hole formed by extrapolating a contour of an inner surface of the pipe at the position of the attachment hole in a cross section of the pipe along the radial direction, and the gas discharge hole is disposed inside the pipe.

8. The gas sensor as claimed in claim 1, wherein a surface of the protector between the gas introduction hole and the gas discharge hole is formed seamlessly and integrally.

9. The gas sensor as claimed in claim 1, wherein an entire surface of the protector between the gas introduction hole and the gas discharge hole is a continuous closed surface.

\* \* \* \* \*